UNITED STATES PATENT OFFICE.

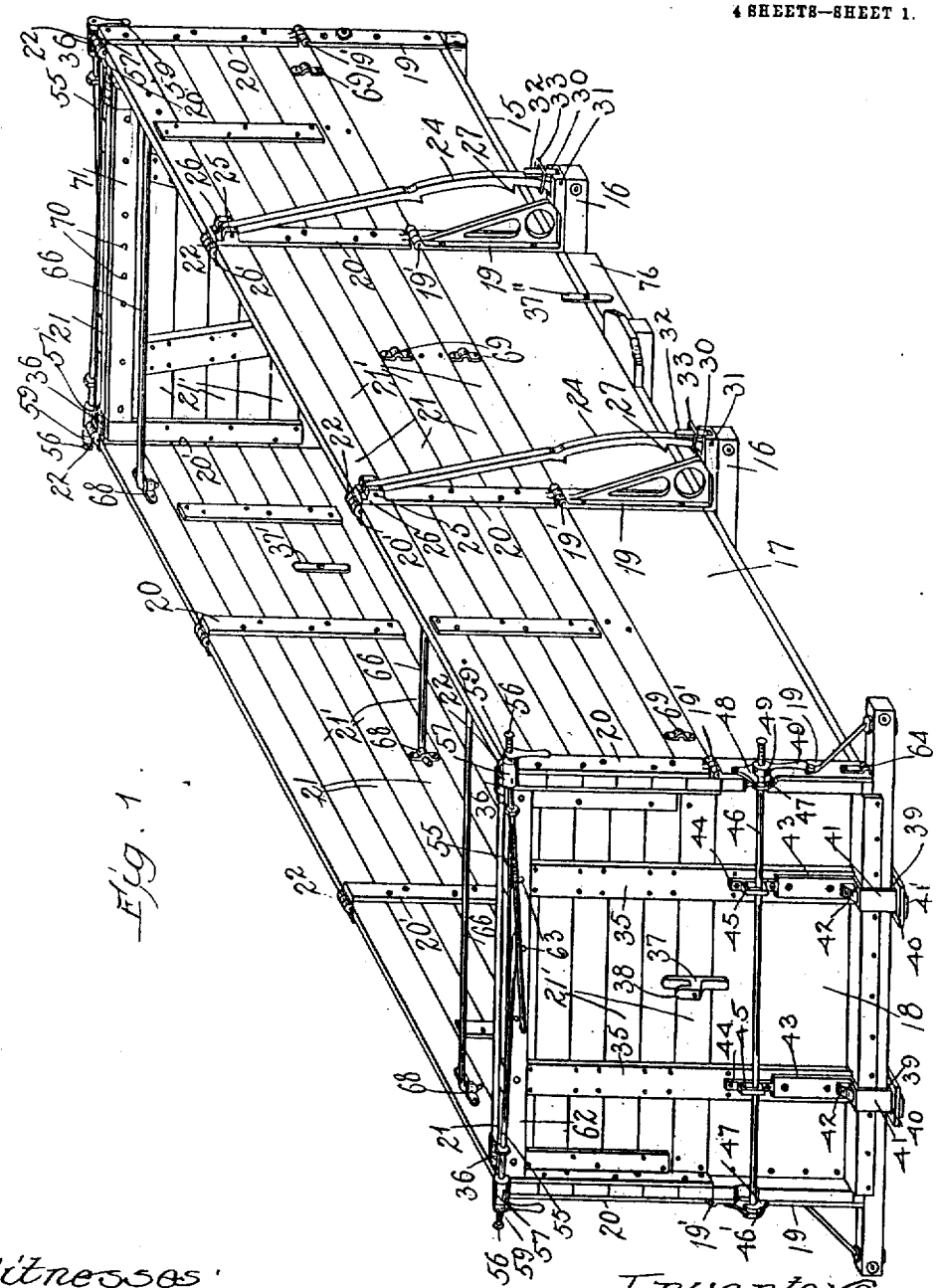

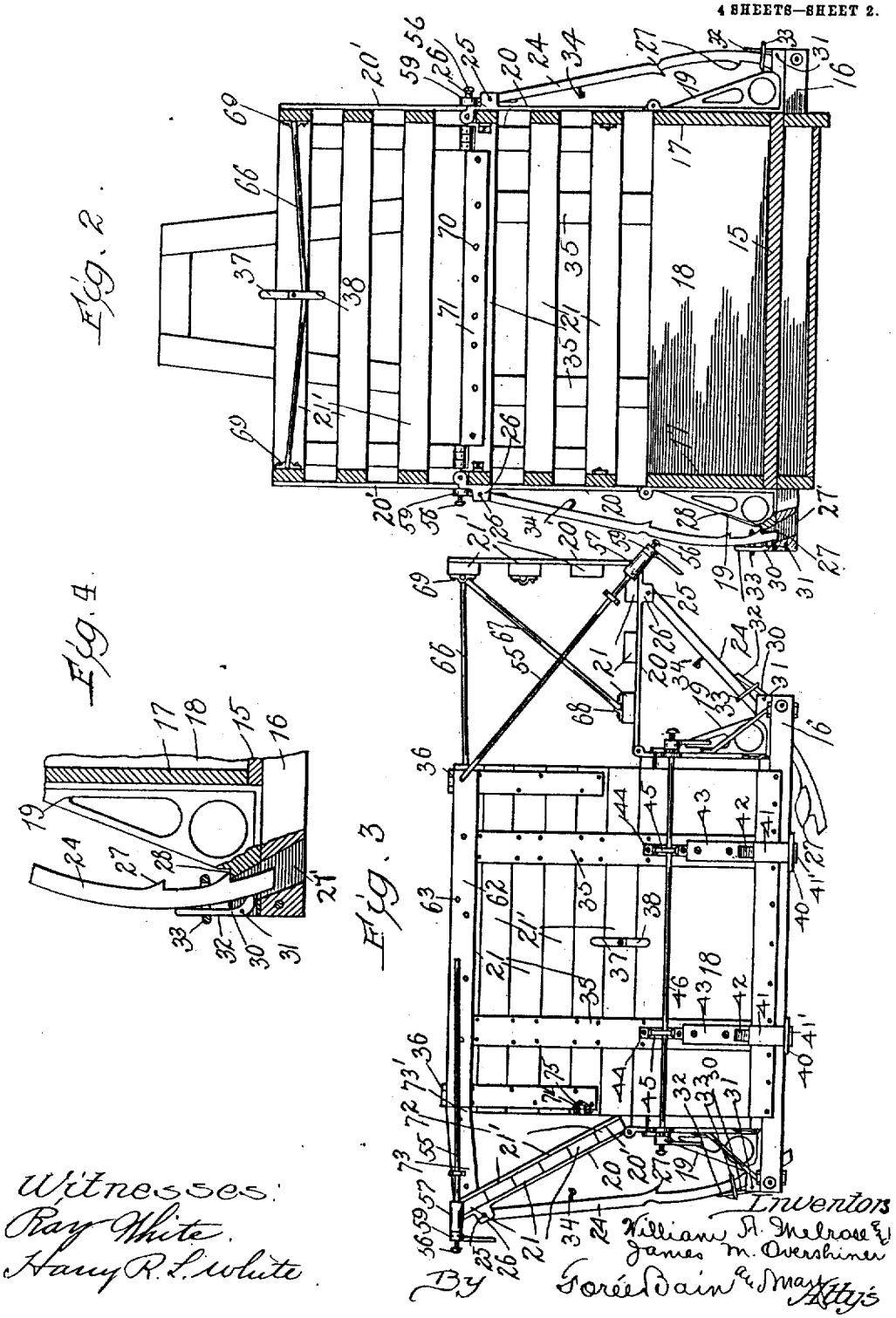

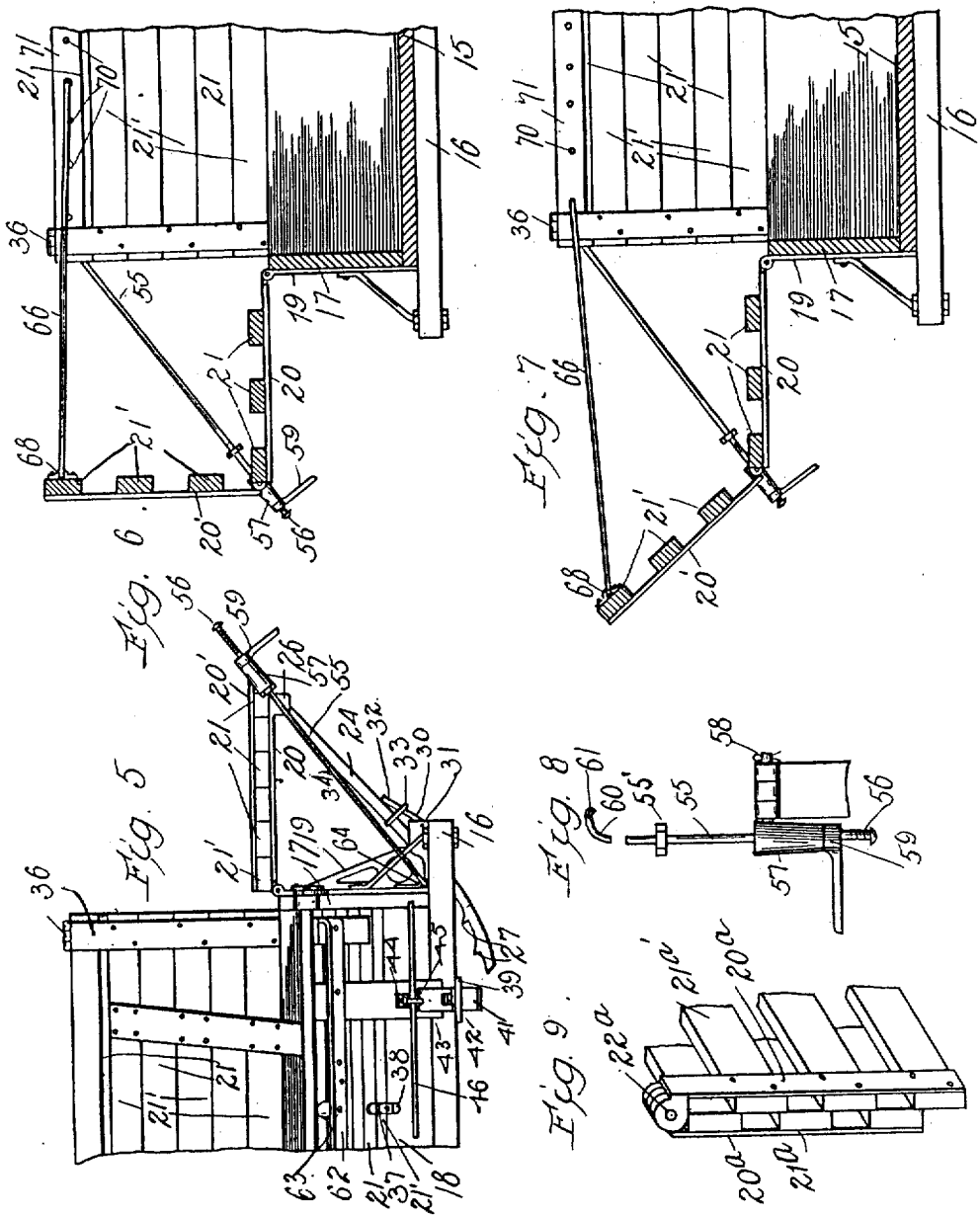
W. A. MELROSE & J. M. OVERSHINER.
WAGON BODY.
APPLICATION FILED FEB. 8, 1906.
No. 917,960. Patented Apr. 13, 1909.
4 SHEETS—SHEET 3.

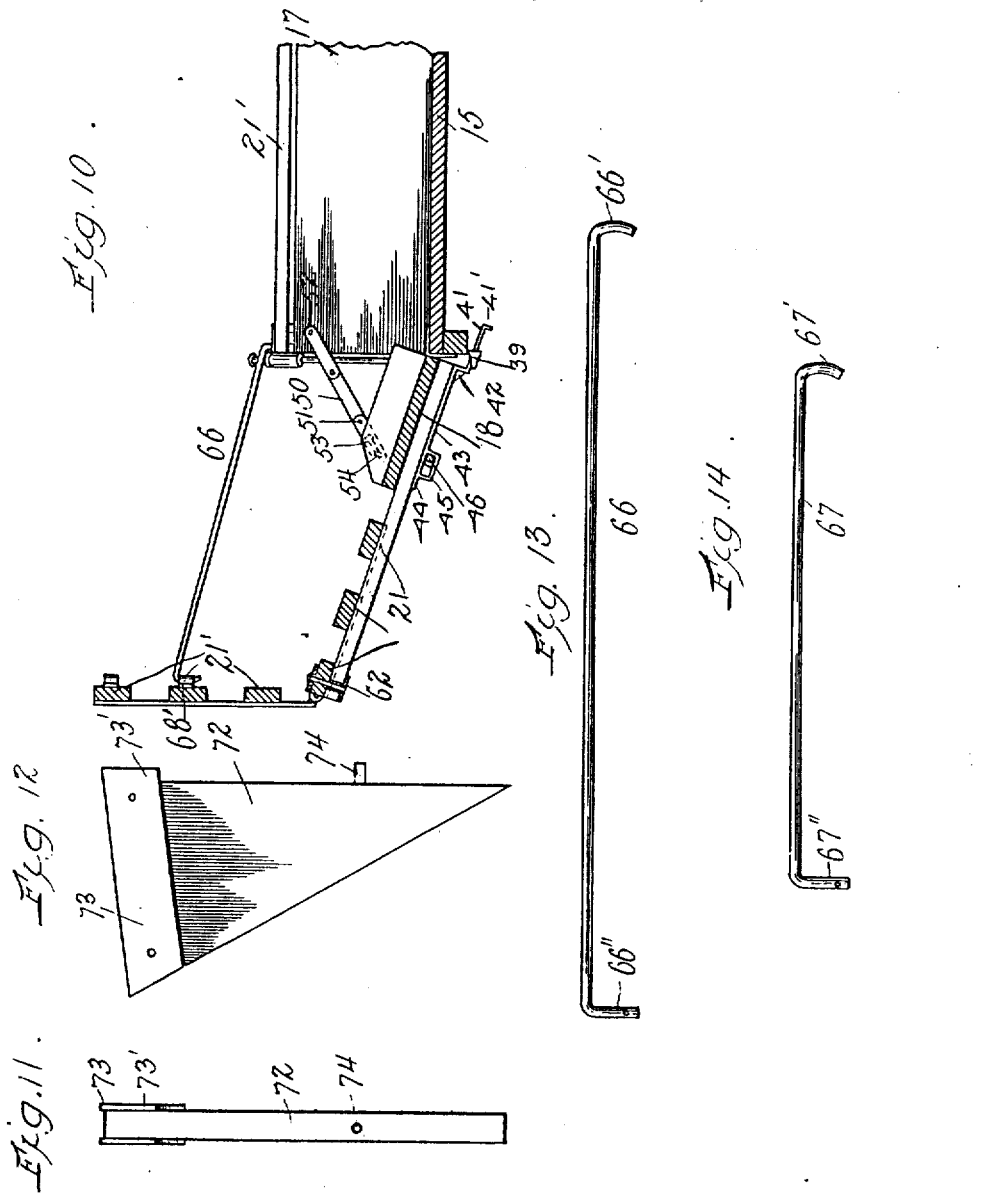

WILLIAM A. MELROSE, OF ELWOOD, INDIANA, AND JAMES M. OVERSHINER, OF CHICAGO, ILLINOIS.

WAGON-BODY.

No. 917,960.  Specification of Letters Patent.  Patented April 13, 1909.

Application filed February 6, 1906. Serial No. 299,692.

*To all whom it may concern:*

Be it known that we, WILLIAM A. MELROSE and JAMES M. OVERSHINER, citizens of the United States, respectively residing at Elwood, in the county of Madison and State of Indiana, and at Chicago, in the county of Cook and State of Illinois, have invented certain new and useful Improvements in Wagon-Bodies, of which the following is a specification.

Our invention relates to improvements in wagon-bodies, and has for its primary object to provide a wagon body, which is convertible into a variety of shapes for diverse uses.

More specifically an object of our invention is to provide in a wagon body having side wings capable of adjustment to different positions, advantageous means for supporting and bracing the side wings in their adjusted positions.

Another object of our invention is to provide a novel tail gate arrangement whereby the tail gate is made susceptible of adjustment to various positions to suit different load conditions, and is removable at pleasure.

A further object is to provide extension end gate structures.

Yet another object of our invention is to provide in conjunction with permanent means for securing the side wings in adjusted position, detachable brace rods capable of use for auxiliary bracing purposes, and arranged for utilization under many different conditions so that a minimum number of auxiliary detachable brace rods may serve all purposes of bracing under the different conditions of use.

Another salient object of our invention is to provide a construction such that the wagon body may be made tight and of suitable shape for the conveyance of grain and like small bodies and yet be capable of extension into an open structure adapted for the conveyance of hay and other like bulky articles.

Other and further objects of our invention may best be gathered from the description taken in conjunction with the drawings, wherein we have illustrated an operative embodiment of our invention.

In the drawings: Figure 1 is an isometric perspective of the wagon box or body, with the parts in position to constitute a straight sided, closed box. Fig. 2 is a transverse section of the box showing the head board of the wagon extended. Fig. 3 is a rear elevation of the wagon, showing one side thereof adjusted to subserve the functions of a grain body, and the opposite side thereof in extended position to form a seat. Fig. 4 is a detail of a part of one of the side wing braces. Fig. 5 is a fragmental rear elevation of the body showing its parts in a different position. Fig. 6 is a sectional view looking toward the tail gate and showing the parts in the position shown to the right in Fig. 3. Fig. 7 is a similar view showing the parts in another position of adjustment. Fig. 8 is a detail of a corner brace rod connection. Fig. 9 is a detail showing the construction of a wing. Fig. 10 is a longitudinal section of the rear end of the box showing the tail gate in extended position. Figs. 11 and 12 are end and side elevations of an attachment employed in converting the body into a grain body. Figs. 13 and 14 are details of auxiliary brace rods, preferably employed in our wagon box.

Throughout the drawings like numerals of reference refer always to like parts.

In the drawings 15 indicates the floor of the vehicle resting upon sills 16 which are preferably extended laterally beyond the floor.

17—17 indicate the rigid parts of the sides and 18 the rigid portion of the front board or front end piece of the body.

To the sills 16 and sides 17 are secured brackets 19 of suitable configuration, having hinged to their upper ends straps 20, to which are connected in interspaced or separated relation slats 21 forming the lower part of the side wing structure. To the upper extremity of the straps 20 are connected by hinged joints 22 the strap sections 20' to which are secured the slats 21' constituting the wing extensions, and arranged to coöperate with the slats 21, when the hinged joints 22 are closed and the wing sections folded together, so that they together make a practically imperforate condensing wing. This may be accomplished either by making the slats 21, 21' to interfit, as shown for example in Fig. 1, or making the slats as shown at 21ᵃ and 21ᵃ' in Fig. 9, that is to say flat and each wider than the interspace of the slats of the opposing section, so that they overlap each other somewhat when folded, the hinged joint 22ᵃ, for such construction, being suitably formed to accomplish such arrangement.

The hinge 22 is preferably of the construction illustrated, providing abutments adjacent the knuckles which prevent the hinge from opening beyond position wherein the winged sections are in alinement, as illustrated in Fig. 2, so that it will be obvious that the wing sections may be opened or extended in vertical alinement, or any position less than in vertical alinement, or may be folded together or condensed to conjointly form imperforate walls.

Braces or struts for securing the side walls in adjusted position independently of each other and of the end gates, are provided, our preferred construction being herein shown as comprising brace bars 24 at their upper ends pivoted as at 25 in brackets 26 preferably secured to or formed integral with the strap members 20—20. The lower extremities of the bars 24 are preferably curved inwardly as best illustrated in Fig. 4, and are arranged to take through apertures 27' formed in the extension braces 19 and extended portions of the sills 16.

At suitable points, preferably on the inner side of the brace rods 24 are provided teeth 27—27 adapted to coact with a tooth 28 suitably disposed on the bracket 19, the toothed arrangement being such that when coacting teeth are in engagement the brace rod or strut is prevented from downward movement.

Means are provided for locking the struts 24 in position of engagement with the teeth 28, such means being herein shown as, and preferably comprising, cam levers 30 pivoted as at 31, and having handles 32, said cams being so shaped that when these handles are moved to vertical position, as shown in Fig. 4, they lock the member 24 in engagement with tooth 28, said cams being capable of movement to outward position sufficient to release the brace members 24 for movement out of engagement with the teeth 28. The handles 32 of the cams may preferably be locked in raised or locking position, by rings 33, surrounding the struts 24, there being preferably provided on each strut a hook 34 for maintaining the ring 33 out of the way when the position of the parts is being adjusted.

It will now be seen by reference particularly to Figs. 2 and 3, that by moving the parts to cause engagement of different teeth 27 of the struts with the coacting teeth 28, the lower sections of the side wings may be adjusted to different angular positions varying from vertical to horizontal, being locked in such positions by the manipulation of the cam levers 30, and further it will be seen that the shape of the struts or brace rods 24 is such that as the side wings are opened out and the struts depressed their curved ends slip beneath the wagon box, as illustrated to the right in Fig. 3.

The head and tail end members of the box are preferably extensible, their general construction being like the side members save that the lower slotted sections are not pivoted to the solid sections 18 but are permanently affixed thereto by braces 35. The upper end wing sections, however, are hinged to the lower sections in the manner heretofore described, and the slat arrangement of each end may be like that of the side wings. The solid part 18 of the head end member is preferably fixed against movement, while the tail gate is movable as hereinafter described.

Means are provided for latching the wing sections and the head and tail gates in closed position, such means comprising latch members 37 pivotally connected to slats of the uppermost or extension wing sections, so that when the wing sections are closed or folded together, the members 37 project between the slats of the lower wing sections and are capable of rotation upon their pivots to latching position, as shown in Fig. 1. The latching members 37 of the head and tail gate are preferably provided with integral cleats 38, for purposes to be hereinafter described. Latches 37' are preferably also provided for the wing extensions of the side wings, but these latches need not be provided with cleats.

For connecting the tail gate with the bottom of the wagon box, we provide, in attachment with the floor or end sill of the body, plates 39, apertured as at 40 to receive tongues 41 connected with the tail gate. These tongues 41 are preferably straps provided at their ends with extensions 41', bent at right angles to the body of the tongue, the tongues having inwardly bent portions 42 and extensions 43 parallel with the body part 41, said portions 43 being suitably secured to the rigid part 18 of the tail gate. Preferably the portions 43 are extended as at 44, said extensions 44 bearing loops 45 through which may be passed a retaining rod 46. The construction of the tongues 41 and their appurtenances is such that when the end gate is closed it is inset somewhat beyond the end of the box bottom 15 and stands in vertical relation to said bottom, the angular end portions 41' underlying and bearing against the plates 39. When swung to open position, however, as shown in Fig. 10, the tongues 41, slip through the apertures 40 in the plates 39, and the solid section 18 of the tail gate is lowered until its inner end is in substantially the plane of the body bottom and makes close contact therewith. It will be obvious furthermore that the tail gate may be readily removed entirely by disengagement of the tongues 41 from the apertures 40 in plates 39.

For retaining the tail gate in vertical position we provide at the sides of the body cleats 47 with which the rod 46 may engage, and associate with said cleats retaining latches 48 arranged when in latching position to close the openings of the cleats 47 so that the rod 46 may not be moved therefrom. To further latch the parts in closed position we preferably provide at one end of the rod 46 a head 46', and screw-thread of the opposite end of the rod, mounting upon the screw threaded end thereof a nut 49 preferably provided with a handle 49' whereby the nut may be screwed up to lock against the latch member 48.

For supporting the tail gate when open we provide the sectional stays or braces 50 whereof the sections, preferably three in number, are pivoted together as at 51, one extreme section being pivoted as at 52 to the adjacent side of the wagon body, and the other end section being detachably connected to the tail gate by the button-hole slot 53 engaging a pin 54. When the tail gate is closed the sections of the stays fold together within the wagon, but when opened they are drawn into alining position as shown in Fig. 10 to afford effective support to the tail gate.

For coöperation with the struts 24 in supporting the side wings in adjusted position, we provide corner tension rods 55 having threaded ends 56 taking through the sleeve 57 having a swivel connection 58 with the upper corner of the lower wing sections, so that the rods 55 may be swung in planes transverse to the planes of the said wing section. An operating nut 59 is mounted upon the threaded end of each tension rod 55, while the free end of each rod is provided with a hook 60, preferably provided at its extremity with a hole 61 to receive a cotter pin.

Upon the upper edge of the lower section of the tail and head gates we mount, preferably outside the braces 35, to be spaced apart from the slats 21, metallic strips 62, provided with holes 63—63 into which the hooks 61 of the corner tension rods may take when the side wings are in different positions of adjustment, as best illustrated in Figs. 1 and 3. It will be apparent that by suitably placing the holes 63, the tension rods are adapted to afford their auxiliary support to the lower sections of the side wings in whatever position of adjustment they may be placed so long as the end members of the body are in vertical position. It may, however, be desired to extend the side wings and at the same time lower the tail gate, as best illustrated in Fig. 5, and in order that the tension members 55 may afford their auxiliary support under these conditions, we provide at suitable points on the frame, preferably at the juncture of the end sills and the side of the wagon body, eyelets 64 with which the tension rods 55 at the rear end of the side wings may engage and a nut 55' which is engaged by the sleeve 57, to serve as struts, as best shown in Fig. 5. It will be apparent that the hooked ends of the tension rods may be secured in position of engagement with the respective apertures by cotter pins if desired, or that by adjusting the nuts 59 the rods may be put under tension sufficient to retain them without the use of such pins. We also preferably provide as auxiliary strengthening devices long brace rods 66 and short brace rods 67, each provided at one end with a hook, as shown at 66' and 67' respectively, and at its other end provided with a bent portion, as shown at 66'', 67'', the bent portions, if desired, being apertured for the reception of cotter pins. The long rods 66 are preferably equal in length to the interior width of the wagon body, and eyelets, as at 68, 68, may be provided at suitable points on the side wings at suitable opposite points to permit of the insertion of the bent ends of the rods 66, to stay the side wings in relation to each other, as best shown in Fig. 1. The extension members of the side wings are preferably also provided with eyelets 69—69, located adjacent their longitudinal extremities, in such position that when the side wing extensions are opened and the extensions of the head or tail board, likewise opened, the rod 66 may be connected between the eyelets 69 in alinement with the cleats 38 of the latches for the adjacent head or tail members, and then cambered or sprung into arched position as shown in Fig. 2, the cleats 38 acting as locking cams to maintain the parts in position, as shown in Fig. 2. When the tail gate is opened and its extension raised, as shown in Fig. 10, a rod 66 may be hooked into a cleat 68' at each corner, and at its other end hooked over some suitable attachment to the body, as the rod 55. The short rods 67 are preferably of suitable length to afford connection between suitable of the cleats 68 of the upper and lower side wing sections, as best shown in Fig. 3. The long rod 66 may also be used as illustrated in Figs. 6 and 7 to effect connection between eyelets 68 of the side wing extensions, and apertures 70 suitably located in a reinforcing metal strip 71 secured to the lower portion of the head and tail members to be presented to the interior of the wagon box. By the provision of these various bracing agencies we provide a wagon body which may be made rigid and secure in any position of adjustment, with a minimum number of parts and great ease of assembling.

For purposes of converting the wagon body into a grain box, having its wings somewhat extended, to conform with a shape of wagon commonly employed for the purpose of hauling grain and the like, we provide triangular inserts 72, specifically illustrated in Fig. 12, preferably having at their upper ends reinforcing strips 73, projecting as at 73' beyond one edge of the insert, there being provided also a pin 74 projecting from the same edge, to take into an aperture 75 in the head or tail member of the box. As will best be seen in Fig. 3 the inserts are applied by forcing the pin 74 into the aperture 75 and the extensions 73' into position to embrace a portion of the head and tail member, the side wing being then brought up to position to bear against the inclined outer edge of the insert, and the whole secured by firmly screwing up the nut of the corresponding tension rods 55 to maintain the insert under tension.

For convenience in carrying the detachable members of the construction, such as the rods 66 and 67, and the inserts 72, when not in use, we preferably provide a sliding drawer 76 at some suitable part of the wagon body, said drawer being of such size and configuration as to readily receive the detachable parts. 37" is a latch or button for holding said drawer in closed position.

It will now be apparent that we have by our present invention provided a body capable of variety of adjustments to suit the varying needs of those engaged in farming or other pursuits, means being provided for effecting the adjustment readily, and for insuring security in the wagon box in whatever position the parts may be adjusted. It will further be apparent that while we have described in some detail a specific embodiment of our invention, whereof we believe the details to be new and advantageous, and may claim in detail, yet in the broader conception of our invention we do not desire to be understood as limiting ourselves.

Having thus described our invention, what we claim and desire to secure by Letters Patent, of the United States, is:

1. A wagon body providing a bottom, apertured extension sills projecting therebeyond, adjustable side wings, and struts pivoted to said wings, taking through the apertures in said sill extension, and means for effecting connection between said struts and the sills in different positions, for holding the wings in varying positions of adjustment.

2. A wagon body providing a bottom, sills extending beyond said bottom, and provided with apertures, adjustable side wings and struts pivoted to said wings, taking through the apertures in said sill extension, said strut being provided with teeth or the like at different elevations, adapted to engage stationary parts associated with the sill extension for bracing the wings in varying positions of adjustment.

3. A wagon body providing a bottom, sills therefor extending laterally on both sides of the bottom, vertical side members 17, wings pivoted to the tops of said vertical members, struts pivoted to said wing members and provided with teeth or the like at different elevations thereon, and braces secured to the vertical side members and the extension sills, provided with apertures through which the toothed ends of the strut may take and with the edges whereof the teeth may engage to hold the side wings in various positions of pivotal adjustment.

4. A wagon bottom providing a bottom, vertical side members, lateral projections from said rigid portions of the body, provided with apertures, side wings pivoted to the rigid vertical portions, struts pivoted at said side wings and taking through the apertures in the extension aforesaid, said strut being provided with teeth adapted to engage the edges of the apertures to maintain the side wings in different positions of vertical adjustment, and means for locking the strut in adjusted position.

5. A wagon body providing a bottom, extension sills supporting said bottom and having apertures therein, pivoted side wings, struts pivoted to the upper extremities of said side wings, said struts taking through the apertures in the sills and being provided with teeth or the like at different elevations, metallic tooth members carried by the sills for coaction with the teeth of the strut, and cams for locking the struts in engagement with the tooth members carried by the sills.

6. A wagon body providing a bottom, lateral extensions therefrom, side wings pivotally supported in relation to the bottom, struts pivoted to said side wings and taking through apertures in the extension aforesaid, said struts being inwardly curved at their lower extremities, and means for securing the struts in adjusted position.

7. In a wagon body, a bottom, end gates, pivoted side wings and tension rods pivoted to the ends of said side wings and provided at their free ends with means for attachment to the end gates to secure the said wings in adjusted position, and at their pivoted ends provided with tension adjusting devices.

8. In a wagon body, a bottom, end gates, pivoted side wings, swiveled sleeves attached to the ends of said side wings, tension rods taking through said sleeves and provided with means for attachment to the end gate, said tension rods being provided with adjusting nuts bearing against the swivel sleeve for adjusting the tension.

9. In a wagon body comprising a bottom, end gates having apertures therein, pivoted side wings, and tension rods pivoted to the ends of said side wings bent at their inner ends to hook into the apertures in the gates, and at their outer ends provided with tension adjusting devices.

10. In a wagon body, a box portion comprising a bottom, sides and end members, pivoted wings connected to the sides, and means for securing the side wings in various positions of adjustment comprising tension rods provided with tension adjusting devices, said rods being pivoted to the ends of the side wings, and at their inner ends provided with means for attachment to relatively fixed parts of the body.

11. In a wagon body comprising members adapted to be secured in relatively stationary relation, pivoted side wings, and means for adjusting said pivoted side wings comprising swivel sleeves secured to the ends of said side wings, tension rods provided at their inner ends with means for attachment to the relatively fixed members and at their outer ends extending through the swivel sleeve, and adjusting bolts upon the threaded outer ends of said tension rods.

12. In a convertible wagon body, end gates, pivoted side wings, brace rods detachably connecting the side wings adjacent the ends, and means carried by the end gates for causing bowing of said brace rods at the time when the latter are connected to said wings, to retain said rods under tension.

13. In a convertible wagon body, a bottom, folding end members, pivoted folding side wings, eyelets carried by the folding sections of the side wings adjacent their ends, and cleats 38, pivotally secured to the extensions to the end gates, arranged to coact with the brace rods 66 to bend the latter to put them under tension.

14. In a convertible wagon body, a bottom, an end gate, pivoted side wings, an insert board arranged between a side wing and the adjacent edge of the tail gate, and a tension rod pivotally secured to the side wing engaging the end gate, and means for applying tension to said rod to retain the insert board in position.

In testimony whereof we hereunto set our hands.

WILLIAM A. MELROSE.
JAMES M. OVERSHINER.

Witnesses for William A. Melrose:
  WOOD BARNES,
  CHASE A. GILLESPIE.

Witnesses for James M. Overshiner:
  FORÉE BAIN,
  MARY F. ALLEN.